United States Patent [19]

Burton

[11] Patent Number: 5,604,617
[45] Date of Patent: Feb. 18, 1997

[54] TELECOMMUNICATIONS SWITCHING ELEMENT

[75] Inventor: Nigel J. Burton, Poole, United Kingdom

[73] Assignee: GPT Limited, United Kingdom

[21] Appl. No.: 294,551

[22] Filed: Aug. 23, 1994

[30] Foreign Application Priority Data

Aug. 27, 1993 [GB]  United Kingdom .................. 9317897

[51] Int. Cl.$^6$ ......................................... H04J 14/00
[52] U.S. Cl. ..................... 359/117; 359/139; 370/380; 370/427; 385/17; 340/825.03
[58] Field of Search ......................... 359/117, 128, 359/139, 140; 385/17; 370/59, 63–64, 60, 60.1; 340/825.79, 825.8, 825.03, 826

[56] References Cited

U.S. PATENT DOCUMENTS

| | | | |
|---|---|---|---|
| 4,787,693 | 11/1988 | Kogelnik et al. ........................ | 385/17 |
| 5,303,077 | 4/1994 | Böttle et al. ............................ | 359/117 |
| 5,369,514 | 11/1994 | Eilenberger et al. .................... | 359/117 |
| 5,432,627 | 7/1995 | Nishio ..................................... | 359/117 |

FOREIGN PATENT DOCUMENTS 0313389  4/1989  European Pat. Off. ............... 359/117

*Primary Examiner*—Wellington Chin
*Assistant Examiner*—Kinfe-Michael Negash
*Attorney, Agent, or Firm*—Kirschstein, et al.

[57] ABSTRACT

A multi-stage telecommunications switch, such as a "rotator", has $2^n$ input ports and $2^n$ output ports, 'n' being an integer greater than 1, and is formed from a number $n \times y^{(n-1)}$ of $y \times y$ switching elements where 'y' is an integer greater than 1 and the elements are arranged in n stages wherein each switching element within a stage x, where 'x' is an integer between 1 and n, changes state every $y^{(x-1)}$ timeslots to provide switching only in the space domain. The switching elements may be electrical or optical devices.

6 Claims, 5 Drawing Sheets

Fig.1.

|  |  |  |  |  |  |  |  |  |  |  |  |  |  |  |  |
|---|---|---|---|---|---|---|---|---|---|---|---|---|---|---|---|
| A1 | B1 | C1 | D1 | E1 | F1 | G1 | H1 | I1 | J1 | K1 | L1 | M1 | N1 | O1 | P1 |
| A2 | B2 | C2 | D2 | E2 | F2 | G2 | H2 | I2 | J2 | K2 | L2 | M2 | N2 | O2 | P2 |
| A3 | B3 | C3 | D3 | E3 | F3 | G3 | H3 | I3 | J3 | K3 | L3 | M3 | N3 | O3 | P3 |
| A4 | B4 | C4 | D4 | E4 | F4 | G4 | H4 | I4 | J4 | K4 | L4 | M4 | N4 | O4 | P4 |
| A5 | B5 | C5 | D5 | E5 | F5 | G5 | H5 | I5 | J5 | K5 | L5 | M5 | N5 | O5 | P5 | --> From 5
| A6 | B6 | C6 | D6 | E6 | F6 | G6 | H6 | I6 | J6 | K6 | L6 | M6 | N6 | O6 | P6 |
| A7 | B7 | C7 | D7 | E7 | F7 | G7 | H7 | I7 | J7 | K7 | L7 | M7 | N7 | O7 | P7 |
| A8 | B8 | C8 | D8 | E8 | F8 | G8 | H8 | I8 | J8 | K8 | L8 | M8 | N8 | O8 | P8 |
| A9 | B9 | C9 | D9 | E9 | F9 | G9 | H9 | I9 | J9 | K9 | L9 | M9 | N9 | O9 | P9 |
| A10 | B10 | C10 | D10 | E10 | F10 | G10 | H10 | I10 | J10 | K10 | L10 | M10 | N10 | O10 | P10 |
| A11 | B11 | C11 | D11 | E11 | F11 | G11 | H11 | I11 | J11 | K11 | L11 | M11 | N11 | O11 | P11 |
| A12 | B12 | C12 | D12 | E12 | F12 | G12 | H12 | I12 | J12 | K12 | L12 | M12 | N12 | O12 | P12 |
| A13 | B13 | C13 | D13 | E13 | F13 | G13 | H13 | I13 | J13 | K13 | L13 | M13 | N13 | O13 | P13 |
| A14 | B14 | C14 | D14 | E14 | F14 | G14 | H14 | I14 | J14 | K14 | L14 | M14 | N14 | O14 | P14 |
| A15 | B15 | C15 | D15 | E15 | F15 | G15 | H15 | I15 | J15 | K15 | L15 | M15 | N15 | O15 | P15 |
| A16 | B16 | C16 | D16 | E16 | F16 | G16 | H16 | I16 | J16 | K16 | L16 | M16 | N16 | O16 | P16 |

Fig.2.

| A   | B   | C   | D   | E   | F   | G   | H   | I   | J   | K   | L   | M   | N   | O   | P   |
| --- | --- | --- | --- | --- | --- | --- | --- | --- | --- | --- | --- | --- | --- | --- | --- |
| A1  | B16 | C15 | D14 | E13 | F12 | G11 | H10 | I9  | J8  | K7  | L6  | M5  | N4  | O3  | P2  |
| A2  | B1  | C16 | D15 | E14 | F13 | G12 | H11 | I10 | J9  | K8  | L7  | M6  | N5  | O4  | P3  |
| A3  | B2  | C1  | D16 | E15 | F14 | G13 | H12 | I11 | J10 | K9  | L8  | M7  | N6  | O5  | P4  |
| A4  | B3  | C2  | D1  | E16 | F15 | G14 | H13 | I12 | J11 | K10 | L9  | M8  | N7  | O6  | P5  |
| A5  | B4  | C3  | D2  | E1  | F16 | G15 | H14 | I13 | J12 | K11 | L10 | M9  | N8  | O7  | P6  |
| A6  | B5  | C4  | D3  | E2  | F1  | G16 | H15 | I14 | J13 | K12 | L11 | M10 | N9  | O8  | P7  |
| A7  | B6  | C5  | D4  | E3  | F2  | G1  | H16 | I15 | J14 | K13 | L12 | M11 | N10 | O9  | P8  |
| A8  | B7  | C6  | D5  | E4  | F3  | G2  | H1  | I16 | J15 | K14 | L13 | M12 | N11 | O10 | P9  |
| A9  | B8  | C7  | D6  | E5  | F4  | G3  | H2  | I1  | J16 | K15 | L14 | M13 | N12 | O11 | P10 |
| A10 | B9  | C8  | D7  | E6  | F5  | G4  | H3  | I2  | J1  | K16 | L15 | M14 | N13 | O12 | P11 |
| A11 | B10 | C9  | D8  | E7  | F6  | G5  | H4  | I3  | J2  | K1  | L16 | M15 | N14 | O13 | P12 |
| A12 | B11 | C10 | D9  | E8  | F7  | G6  | H5  | I4  | J3  | K2  | L1  | M16 | N15 | O14 | P13 |
| A13 | B12 | C11 | D10 | E9  | F8  | G7  | H6  | I5  | J4  | K3  | L2  | M1  | N16 | O15 | P14 |
| A14 | B13 | C12 | D11 | E10 | F9  | G8  | H7  | I6  | J5  | K4  | L3  | M2  | N1  | O16 | P15 |
| A15 | B14 | C13 | D12 | E11 | F10 | G9  | H8  | I7  | J6  | K5  | L4  | M3  | N2  | O1  | P16 |
| A16 | B15 | C14 | D13 | E12 | F11 | G10 | H9  | I8  | J7  | K6  | L5  | M4  | N3  | O2  | P1  |

--> To 7

TELECOMMUNICATIONS SWITCHING ELEMENT

BACKGROUND OF THE INVENTION

The present invention relates to a telecommunications switching element referred to as a "rotator" and described in patent applications nos. GB2258360, GB2258366, GB2258581 and GB2258582, corresponding to U.S. application Ser. Nos. 08/030,341, 08/030,231, 08/030,402 and 08/030,166, respectively, imported herein by reference.

SUMMARY OF THE INVENTION

According to the present invention there is provided a multi-stage telecommunications switching means having $2^n$ input and $2^n$ output ports, where 'n' is an integer greater than 1, comprising a number $n \times y^{(n-1)}$ of y×y switching elements where 'y' is an integer greater than 1 arranged in n stages wherein each switching element within a stage x, where x is an integer between 1 and n, changes state every $y^{(x-1)}$ timeslots to provide switching only in the space domain.

Further there is provided a multi-stage telecommunications switching means as above, having $2^n$ inputs and $2^n$ outputs, and wherein y is equal to 2, whereby there are $n \times 2^{(n-1)}$ switching elements arranged in 'n' stages and each switching element within a stage 'x', where x is an integer between 1 and n inclusive, changes state every $2^{(x-1)}$ timeslots.

BRIEF DESCRIPTION OF THE DRAWINGS

The present invention will now be described, by way of example, with reference to the accompanying drawings, in which:

FIG. 1 shows a rotator input channel map;

FIG. 2 shows a rotator output channel map;

DETAILED DESCRIPTION OF THE PREFERRED EMBODIMENTS

Figure 3A:
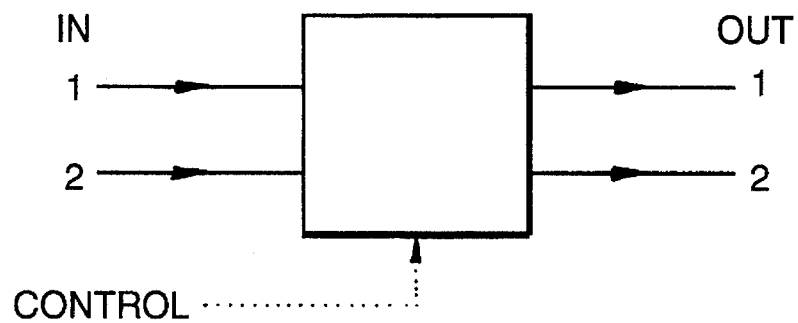
FIG. 3(a) shows a basic 2×2 switching device.

A Rotator is part of an ATM or STM switch fabric and performs a mixing and spatial routing function between its inputs and outputs. The Rotator described as an example has 16 inputs and 16 outputs. The inputs to the Rotator each have 16 slots in a conceptual frame. The Rotator space switches the slots so that each input has a single slot to each output per frame, and consequently each output has one slot from each input.

It is important that the Rotator preferably should introduce no additional delay, and therefore no timeswitching functions are possible. The present invention provides a Rotator function that satisfies the zero-delay requirement.

The invention further allows a migration from electrical to optical technology with no change to the control or timing relationship.

The rotator functionality can be represented by the input and output channel maps shown in FIGS. 1 and 2 respectively.

The input channel map in FIG. 1 shows the 16 inputs to the rotator in the vertical dimension annotated by the numbers 1 to 16, and the 16 timeslots per cycle in the horizontal direction annotated A to P.

One internal cycle from input number 5 is highlighted for explanation. It can be seen that input number 5 is divided into 16 timeslots, A5 to P5. The rotator will take the 16 timeslots and transmit one to each central stage.

In the output channel map, FIG. 2, one cycle to central stage switch 7 is highlighted, and it can be seen that sample C from input number 5 will be transmitted to central switch 7.

Note that all samples remain in their respective columns, i.e. they are not moved in the horizontal plane, which represents the time domain, but only moved in the vertical plane which represents the space domain. Thus no time switching is performed and therefore no additional delay is incurred in the rotator.

Figure 3B:
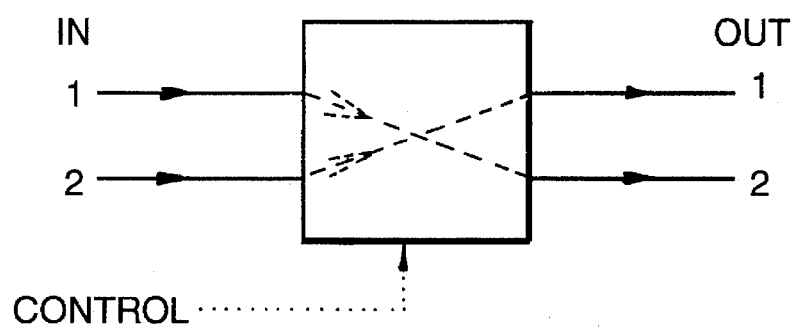
FIG. 3(b) shows the device of FIG. 3(a) in the "cross" state.
Figure 3C:
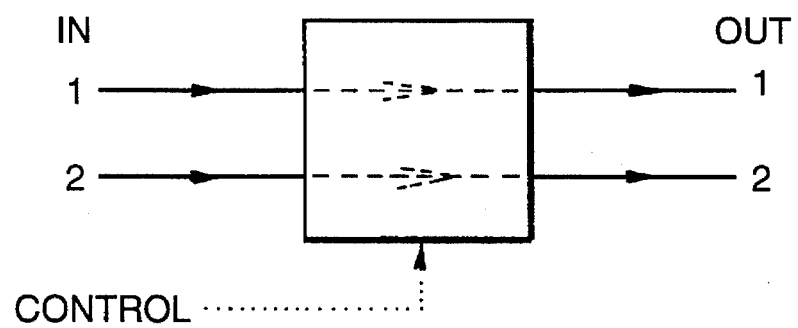
FIG. 3(c) shows the device of FIG. 3(b) in the "bar" state.
Figure 4:
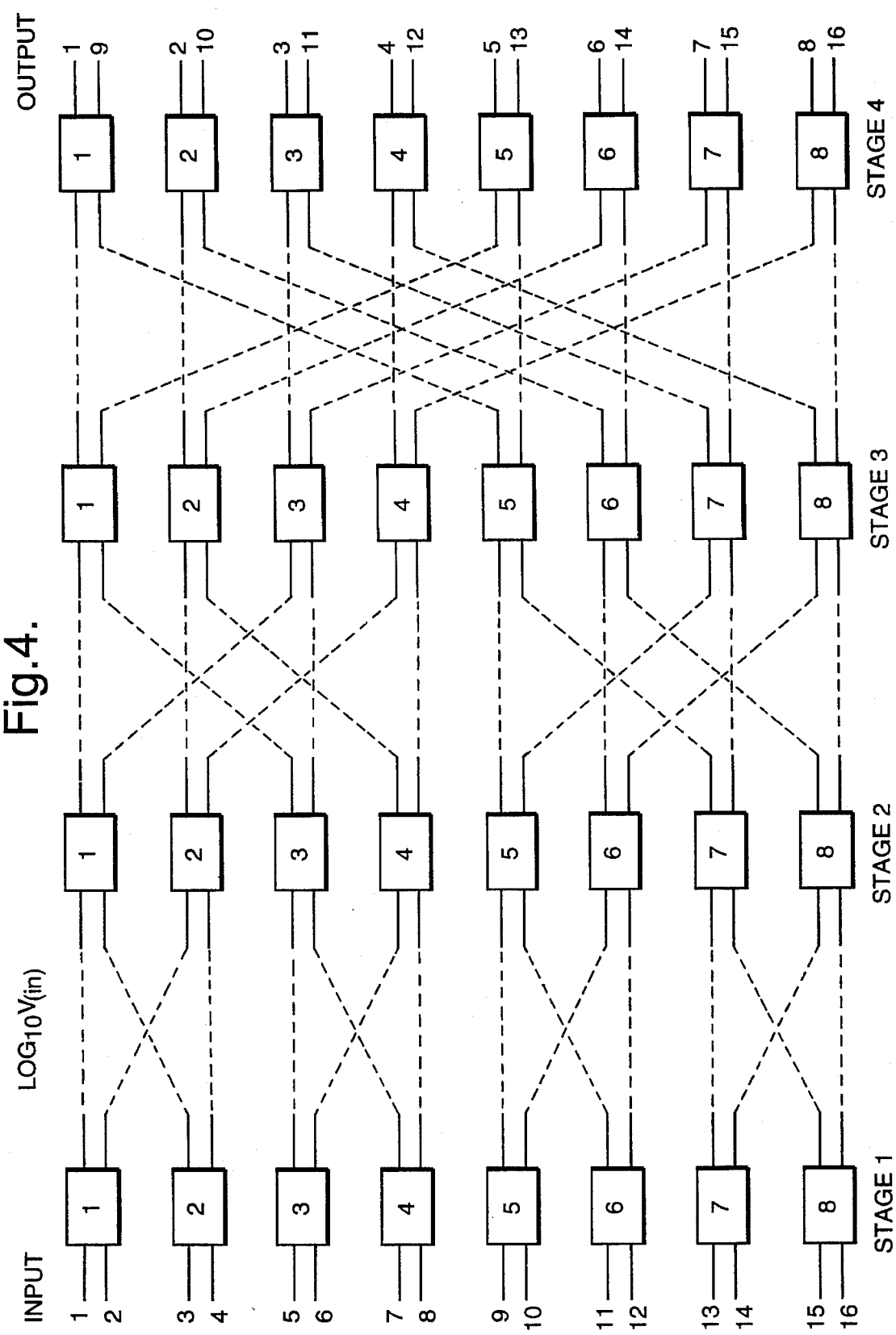
FIG. 4 shows an interconnected array of devices of FIG. 3(a)

The Rotator, as shown in FIG. 4, is implemented by means of multiple interconnected 2×2 switching elements (32 in total), FIG. 3(a), which may be in turn be implemented either optically or electrically. The 2×2 element has two states, a 'cross' state and a 'bar' state, shown in FIGS. 3(b) and 3(c) respectively. A simple control interface switches the element between the 2 states. The 32 elements must be interconnected in the manner shown in FIG. 4.

The timing of the control signals 'cross' and 'bar' with reference to the start of the frame is as shown below, where 'B' represents a 'bar' and 'C' a 'cross' signal.

| Stage 1: | | | | | | | | | | | | | | | | |
|---|---|---|---|---|---|---|---|---|---|---|---|---|---|---|---|---|
| All elements | | | | | | | | | | | | | | | | |
| T/S: | 1 | 2 | 3 | 4 | 5 | 6 | 7 | 8 | 9 | 10 | 11 | 12 | 13 | 14 | 15 | 16 |
| State: | B | C | B | C | B | C | B | C | B | C | B | C | B | C | B | C |
| Stage 2: | | | | | | | | | | | | | | | | |
| Elements 1, 3, 5, 7 | | | | | | | | | | | | | | | | |
| T/S: | 1 | 2 | 3 | 4 | 5 | 6 | 7 | 8 | 9 | 10 | 11 | 12 | 13 | 14 | 15 | 16 |
| State: | B | C | C | B | B | C | C | B | B | C | C | B | B | C | C | B |
| Elements 2, 4, 6, 8 | | | | | | | | | | | | | | | | |
| T/S: | 1 | 2 | 3 | 4 | 5 | 6 | 7 | 8 | 9 | 10 | 11 | 12 | 13 | 14 | 15 | 16 |
| State: | B | B | C | C | B | B | C | C | B | B | C | C | B | B | C | C |

-continued

Stage 3:

Elements 1, 5

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | C | C | C | C | B | B | B | B | C  | C  | C  | C  | B  | B  | B  |

Elements 2, 6

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | C | C | C | C | B | B | B | B  | C  | C  | C  | C  | B  | B  |

Elements 3, 7

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | C | C | C | C | B | B | B  | B  | C  | C  | C  | C  | B  |

Elements 4, 8

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | C | C | C | C | B | B  | B  | B  | C  | C  | C  | C  |

Stage 4:

Element 1

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | C | C | C | C | C | C | C | C | B  | B  | B  | B  | B  | B  | B  |

Element 2

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | C | C | C | C | C | C | C | C  | B  | B  | B  | B  | B  | B  |

Element 3

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | C | C | C | C | C | C | C  | C  | B  | B  | B  | B  | B  |

Element 4

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | C | C | C | C | C | C  | C  | C  | B  | B  | B  | B  |

Element 5

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | B | C | C | C | C | C  | C  | C  | C  | B  | B  | B  |

Element 6

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | B | B | C | C | C | C  | C  | C  | C  | C  | B  | B  |

Element 7

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | B | B | B | C | C | C  | C  | C  | C  | C  | C  | B  |

Element 8

| T/S:   | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| State: | B | B | B | B | B | B | B | C | C | C  | C  | C  | C  | C  | C  | C  |

The implementation described performs the required functionality of the Rotator with zero delay (except for propagation delay), and can either be implemented using electronic or optic technology using the same control and timing information. Both Lithium Niobate and Indium Phosphide are suitable materials for optic implementation of the Rotator function.

Figure 5:
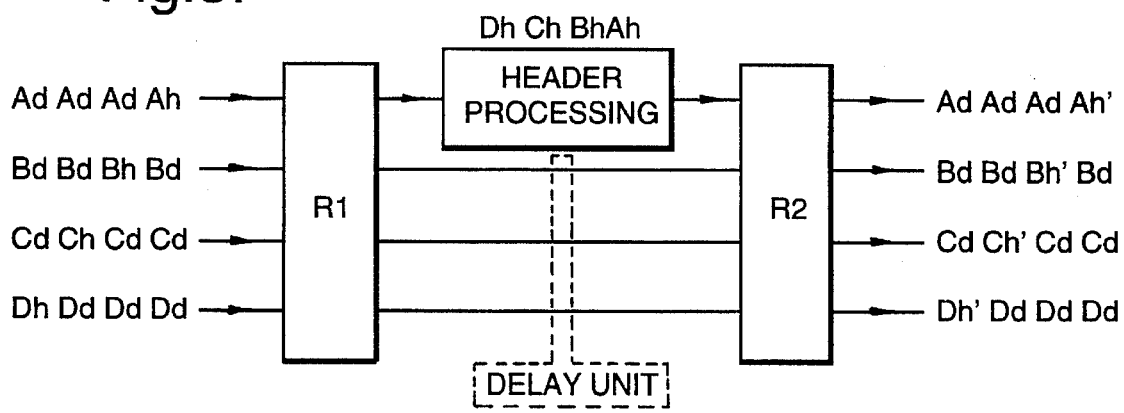
FIG. 5 shows two 4×4 rotators interconnected to provide an inverse transformation.

Using a pair of interconnected Rotators R1, R2, shown in FIG. 5 as 4×4 units for this example, such that $R2=[R1]^{-1}$, i.e. R2 performs the inverse function to R1 leaving the inputs unchanged for each Rotator.

Ad, Bd, Cd, Dd represent the data from inputs A, B, C, D respectively and Ah, Bh, Ch, Dh represent the header information from inputs A, B, C, D respectively.

The header information is switched by R1 to the Header Processing where SOH handling, ATM cell header translation/policing and other functions can be carried out to provide modified headers Ah', Bh', Ch', Dh'. Equivalent delays are then applied to the data by the Delay Unit. The data streams are then reconstituted by the Rotator R2.

What I claim is:

1. A multi-stage telecommunications switch having $2^n$ input and $2^n$ output ports, where 'n' is an integer greater than 1, comprising: a number $n \times y^{(n-1)}$ of y×y switching elements, where 'y' is an integer greater than 1, arranged in n stages, wherein each switching element within a stage x, where x is an integer between 1 and n, changes state every $y^{(x-1)}$ timeslots to provide switching only in the space domain.

2. The switch as claimed in claim 1, having $2^n$ inputs and $2^n$ outputs, wherein y is equal to 2, whereby there are $n \times 2^{(n-1)}$ switching elements arranged in 'n' stages and each switching element within a stage 'x', where x is an integer between 1 and n inclusive, changes state every $2^{(x-1)}$ timeslots.

3. The switch as claimed in claim 1 wherein each switching element has two states, a first state wherein each input port is connected to a corresponding output port and a second state wherein each input port is cross-connected to an opposite output port.

4. The switch as claimed in claim 1 wherein the switching elements are optical devices.

5. A processing circuit comprising: a first and a second multi-stage telecommunications switch, each switch having $2^n$ input and $2^n$ output ports, where 'n' is an integer greater than 1, each switch further having a number $n \times y^{(n-1)}$ of y×y switching elements, where 'y' is an integer greater than 1, arranged in n stages, wherein each switching element within a stage x, where x is an integer between 1 and n, changes state every $y^{(x-1)}$ timeslots to provide switching only in the space domain, wherein the second switch performs a function inverse to that performed by the first switch, and further comprising a header processing unit connected between an output of the first switch and the corresponding input of the second switch.

6. The processing circuit as claimed in claim 5, further comprising delay means between the remaining corresponding outputs of the first switch and inputs of the second switch.

* * * * *